UNITED STATES PATENT OFFICE.

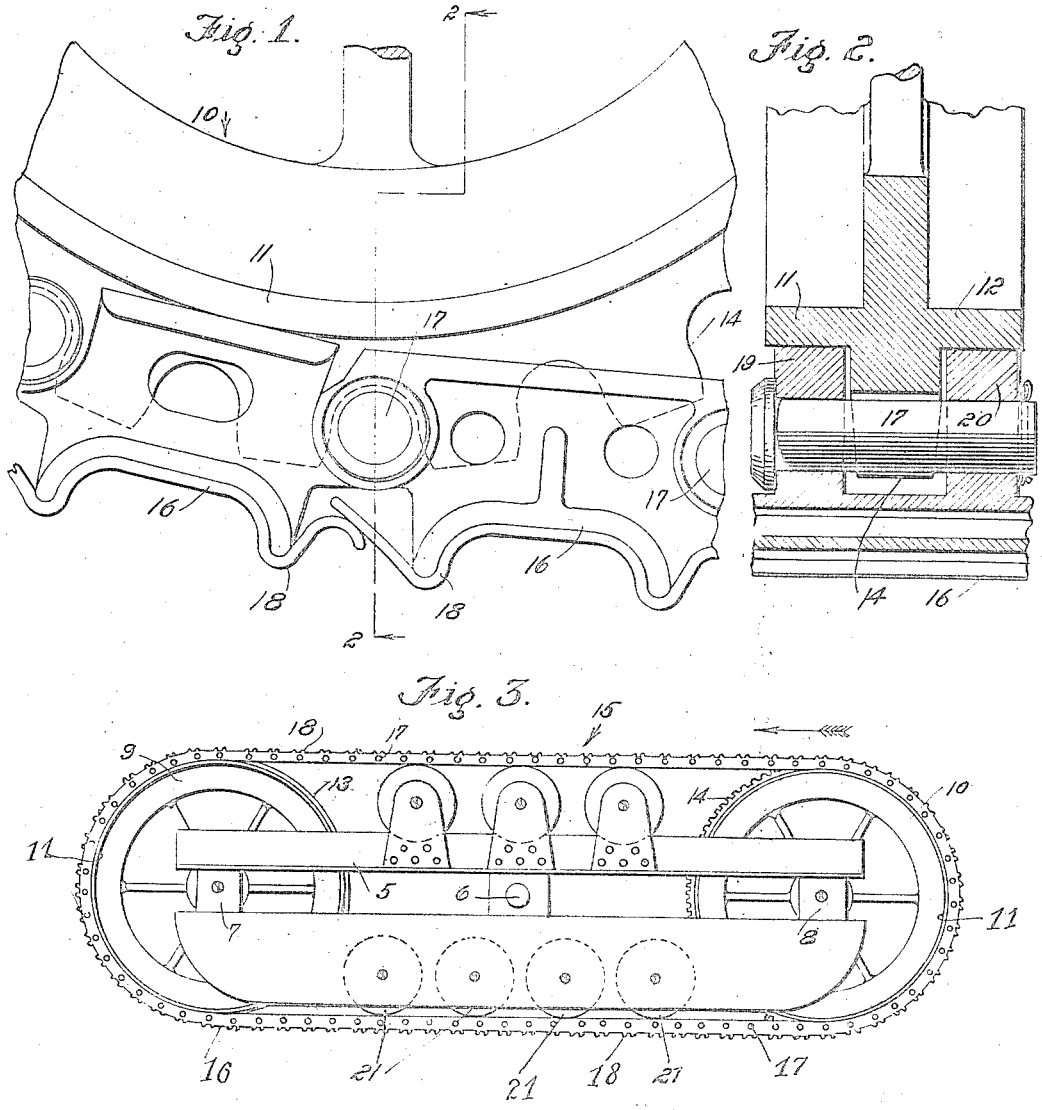

WILLIAM F. HAMILTON, OF VENTURA, CALIFORNIA.

BELT-TRACTOR.

1,222,546.   Specification of Letters Patent.   Patented Apr. 10, 1917.

Application filed December 9, 1914. Serial No. 876,297.

*To all whom it may concern:*

Be it known that I, WILLIAM F. HAMILTON, a citizen of the United States, residing at Ventura, in the county of Ventura, State of California, have invented new and useful Improvements in Belt-Tractors, of which the following is a specification.

This invention relates to a belt tractor, and particularly pertains to the tractor belt mounting.

In the ordinary construction of the tractor belt and drive mechanism the tractor belt is formed of a series of tread links connected together in the form of a sprocket chain which is passed around a driving sprocket and an idler wheel on a rigid frame with the lower leaf of the belt passing under bearing rollers by which the tread portion of the belt is maintained in contact with the surface of the ground; the links of the chain belt being engaged by the driving sprocket with their pins seating between the sprocket teeth. This construction has proved objectionable in that excessive wear of the pins and sprocket teeth results from the crowding of the links against the sprocket when the tractor is passing over obstacles or uneven surfaces, and also in the restricted tread area resulting from the necessary inclination of the belt to and from the bearing rollers in order to permit the tractor to pass over obstacles.

It is the object of this invention to provide a construction of the belt links and its supporting and driving wheels by means of which the links will be supported on the wheels with the connecting pins of the links spaced clear of the bottom walls of the spaces between the sprocket teeth, thereby overcoming the objectionable wearing of the pins and sprockets as occurs in the ordinary construction above stated.

A further object is to provide a sprocket wheel and link construction for tractor belts combined with an oscillating carrying frame whereby the length of tread portion of the tractor belt is increased as compared with ordinary constructions having corresponding dimensions, thereby offering a greater traction driving area and support for the tractor and which will serve to facilitate the climbing of hills and passing over obstacles or uneven surfaces.

The invention is illustrated in the accompanying drawing, in which:

Figure 1 is a view in side elevation of the lower portion of the sprocket wheel showing a section of the tractor belt as engaged thereby.

Fig. 2 is a detail section and elevation on the line 2—2 of Fig. 1 as seen in the direction indicated by the arrows, and showing the manner in which the connecting pins of the belt links are maintained clear of the bottom walls of the spaces between the sprocket teeth.

Fig. 3 is a view in side elevation of the tractor belt mounting showing the invention as applied.

More specifically, 5 indicates a tractor frame which is mounted to oscillate on a pivot pin 6 and which frame is fitted with bearings 7 and 8 at its opposite ends on which wheels 9 and 10 are revolubly mounted.

The wheels 9 and 10 are formed with laterally extending annular flanges 11 and 12 on the opposite sides and adjacent the periphery thereof. The flanges 11 and 12 are arranged to project on opposite sides of a continuous annular rib 13 on the periphery of the wheel 9 and to extend on the opposite sides of sprocket teeth 14 formed on the periphery of the wheel 10 to form seats or bearing surfaces for a tractor belt 15. The belt 15 is formed of a series of tread links 16 connected together by pins 17 in the form of a sprocket chain.

The outer faces of the links 16 are formed with projections 18 for tractive engagement with the ground surface and are formed with longitudinally extending flanges 19 and 20 on the inner faces thereof adapted to extend on the opposite side of the rib 13 and the sprocket teeth 14 and to seat upon the flanges 11 and 12. The inner faces of the flanges 19 and 20 are so arranged in relation to the peripheries of the connecting pins 17 and to the bottom walls of the recesses between the sprocket teeth 14 that the pin 17 will be held out of contact with the bottom walls of the spaces between the teeth 14 as particularly shown in Fig. 2, when the chain or belt passes around the wheel 10. Likewise the pin 17 will be supported clear of the rib 13 on the wheel 9 with the flanges 19 and 20 seated on the flanges 11 and 12 of the wheel 9 on opposite sides of the rib 13, which rib serves to prevent lateral displacement of the tractor belt.

Mounted on the frame 5 on the lower side thereof is a series of rollers 21 disposed in horizontal alinement with their lower faces on a plane with the lowermost portions of the outer faces of the flanges 11 and 12 on the wheels 9 and 10. These rollers are adapted to bear upon the upper faces of the lower leaf of the belt 15 as shown in Fig. 3 to maintain the belt in tractive engagement with the road surface throughout the central portion of the tractor belt between the wheels 9 and 10, and thereby distribute the weight of the tractor over a proportionately large area of the tractor belt. This also provides a greater traction driving area.

The flanges 11 and 12 coöperate with the rollers 21 to form a seat for the tread portion of the tractor belt extending between the points where it passes around the lower parts of the wheels 9 and 10. By pivoting the frame 5, the latter is free to rock and assume an inclined position when the end wheels 9 or 10 engage obstacles on the ground surface, so as to enable the tractor to climb over such obstacles. This arrangement serves to increase the length of the tread portion of the belt as compared with constructions where the flanges 11 and 12 are not employed and where the belt is inclined from the end wheels to the bearing rollers to facilitate the passing over the obstructions and irregular surfaces. The large tractor surface thus obtained enables the use of the tractor on soft ground.

What I claim is:

1. In a tractor, the combination of a tractor belt, having a series of links connected together by pivot pins, a pair of driving sprockets around which said belt passes, said sprockets engaging the pivot pins of the links, means on said sprockets overhanging the spaces between the teeth thereon for engaging and supporting the links to maintain the pins out of contact with the bottom walls of the recesses between the sprocket teeth on said sprockets, and a series of bearing rollers on which the lower leaf of said belt is supported in alinement with the lower face of said means, whereby the sprockets and rollers support the tractor.

2. In a tractor, the combination of a tractor belt, comprising a series of connected sprocket links and pivot pins forming connections between the adjacent links, a pair of sprocket wheels around which said belt passes, said sprocket wheels having laterally extending flanges overhanging the spaces between the teeth thereon engaging the links of the tractor belt to maintain the pins out of contact with the bottom walls of the spaces between the sprocket teeth on said wheels, and a series of bearing rollers on which the lower leaf of said belt is supported in alinement with the lower faces of the flanges on said wheels, whereby the wheels and rollers support the tractor.

3. In a tractor, the combination of a tractor belt, comprising a series of links connected together by pivot pins, a pair of sprockets around which said belt passes, said sprockets having laterally extending annular flanges on the opposite sides of the sprocket teeth thereon, overhanging the spaces between the teeth and engaging and supporting the tractor belt to maintain the pivot pins on said belt out of contact with the bottom walls of the recesses between the sprocket teeth, and a series of bearing rollers on which the lower leaf of said belt is supported in alinement with the lower faces of the flanges on said wheels, whereby the sprockets and rollers support the tractor.

In witness that I claim the foregoing I have hereunto subscribed my name this 17th day of October, 1914.

WILLIAM F. HAMILTON.

Witnesses:
 R. S. BERRY,
 MARIE BATTEY.